United States Patent [19]

Takida et al.

[11] 3,976,618

[45] Aug. 24, 1976

[54] MOLDING MADE OF HYDROLYZED ETHYLENE-VINYL ACETATE COPOLYMER

[75] Inventors: Hiroshi Takida, Takatsuki; Yoshimi Akamatu, Amagasaki, both of Japan

[73] Assignee: Nippon Gohsei Kagaku Kogyo Kabushiki Kaisha, Osaka, Japan

[22] Filed: July 30, 1974

[21] Appl. No.: 493,648

[30] Foreign Application Priority Data

Aug. 14, 1973 Japan................................ 48-91154

[52] U.S. Cl............................ 260/40 R; 260/42.47; 260/42.51; 260/42.52; 264/328
[51] Int. Cl.².......................................... C08K 3/34
[58] Field of Search............ 260/42.51, 42.52, 40 R, 260/42.47

[56] References Cited
OTHER PUBLICATIONS

Chemical Abstracts, vol. 70, 1969, 7802r.
Raff R.A.V. et al., Crystalline Olefin Polymers, Part II, Interscience Pub., New York, 1964, p. 265.

*Primary Examiner*—James H. Derrington
*Attorney, Agent, or Firm*—Armstrong, Nikaido & Wegner

[57] ABSTRACT

Molding, having an improved heat deflection property, comprising 95 to 50 % by weight of hydrolyzed ethylene-vinyl acetate copolymer and 5 to 50 % by weight of talc. Dispersion of larger amount of talc in molding composition is improved by incorporating 2 to 10 % by weight of elastomers per the copolymer.

5 Claims, No Drawings

MOLDING MADE OF HYDROLYZED ETHYLENE-VINYL ACETATE COPOLYMER

BACKGROUND OF THE INVENTION

The present invention relates to an improvement of moldings made of hydrolyzed ethylene-vinyl acetate copolymer, more particularly to moldings having an improved heat deflection property.

Moldings made of hydrolyzed ethylene-vinyl acetate copolymer are superior to other resin moldings in the properties such as stiffness, hardness, abrasion-resistance and antistatic charge and, therefore, they have been expected to use for so-called engineering plastics such as machine parts, automobile parts, aircraft parts or electric-device parts. However, the copolymer has the disadvantage that the heat deflection temperature thereof is low compared with other known engineering plastics. For instance, the heat deflection temperature of hydrolyzed ethylene-vinyl acetate copolymer having an ethylene content of 30% by mole, a vinyl acetate content of 70 % by mole and a degree of hydrolysis in vinyl acetate component of 99.5 % by mole is only about 70°C. On the other hand, the heat deflection temperature of acrylonitrile-butadiene-styrene resin and acrylonitrile-styrene resin is 86°C. and 83°C., respectively. Therefore, when moldings made of the copolymer are handled at a high temperature or when a temperature of moldings rises during use due to generation of frictional heat, there may cause troubles such as deformation, deflection and distortion, which are great disadvantages for engineering plastics requiring severe dimensional stability.

Hithertofore, incorporation of a filler into a resin has been proposed in order to improve mechanical strength and stiffness of moldings. However, it has never been known and also never been attempted to incorporate talc into hydrolyzed ethylene-vinyl acetate copolymer to raise heat deflection temperature of the copolymer.

OBJECTS OF THE INVENTION

It is an object of the present invention to provide moldings made of hydrolyzed ethylene-vinyl acetate copolymer having a higher heat deflection temperature.

A further object of the invention is to provide moldings made of hydrolyzed ethylene-vinyl acetate copolymer having an improved tensile strength and flexural strength in addition to the rise of heat deflection temperature.

Another object of the invention is to provide a process for improving heat deflection property of moldings made of hydrolyzed ethylene-vinyl acetate copolymer without lowering tensile strength, flexural strength and impact-resistance and losing advantageous characteristics of the hydrolyzed copolymer such as stiffness, hardness, abrasion-resistance and antistatic charge, in which molding can be carried out smoothly.

These and other objects of the invention will become apparent from the description hereinafter.

DETAILED DESCRIPTION

It has now been found that the above-mentioned objects can be attained by incorporating a specific amount of talc into a hydrolyzed ethylene-vinyl acetate copolymer and melt-molding the resulting composition.

According to the present invention, the hydrolyzed ethylene-vinyl acetate copolymer incorporated with talc can be molded smoothly even by injection molding which requires severe setting of molding conditions and provides moldings having an improved heat deflection property without losing advantageous characteristics of the copolymer such as stiffness, hardness, abrasion-resistance and antistatic charge. Moreover, not only the heat deflection temperature rises, but also the incorporation of talc gives the advantages that impact-resistance of the molding does not drop, and tensile strength and flexural strength of the molding are improved.

In the present invention, it is essential to incorporate talc into hydrolyzed ethylene-vinyl acetate copolymer in the ratio of 5 : 95 to 50 : 50 by weight. By the incorporation of a filler other than talc, satisfactory improvements can not be gained. According to the present inventor's examination, some fillers cause troubles that, upon melt-molding, especially injection molding, a melted resin is not extruded smoothly out of a nozzle of molding machine even if the molding pressure is raised, because the viscosity of melted resin abnormally increases after a while from the beginning of molding. Also, other fillers which do not cause troubles on molding may improve the heat deflection property to some extent, but in most cases physical properties, especially impact-resistance, are spoiled.

The followings are the results of the injection molding of the composition which consists of hydrolyzed ethylene-vinyl acetate copolymer, having an ethylene content of 30 % by mole and a degree of hydrolysis in vinyl acetate component of 99.5 % by mole, and a filler, conventionally employed for molding, in the ratio of of 85 % by weight of the hydrolyzed copolymer and 15 % by weight of a filler.

|  | Molding for long period | Heat deflection temp. | Impact strength | Tensile strength | Flexural strength |
| --- | --- | --- | --- | --- | --- |
| Calcined gypsum | possible | rise | drop | no change | no change |
| Calcium silicate | impossible | — | — | — | — |
| Silica | impossible | — | — | — | — |
| Calcium carbonate | possible | a bit of rise | no change | a bit of drop | no change |
| Clay | impossible | — | — | — | — |
| Pyrophyllite | impossible | — | — | — | — |
| Titanium oxide | possible | a bit of rise | no change | no change | no change |
| Carbon black | possible | rise | drop | a bit of drop | a bit of drop |
| Asbestos | impossible | — | — | — | — |
| Garnet | impossible | — | — | — | — |
| Glass beads | possible | a bit of rise | drop | no change | no change |

The hydrolyzed ethylene-vinyl acetate copolymers employed in the present invention are those having an ethylene content of 20 to 50 % by mole, a vinyl acetate content of 80 to 50 % by mole and a degree of hydrolysis in vinyl acetate component of not less than 90 % by mole. Especially, hydrolyzed ethylene-vinyl acetate copolymers having an ethylene content of 25 to 40 % by mole, a vinyl acetate content of 75 to 60 % by mole and a degree of hydrolysis in vinyl acetate component of not less than 95 % by mole are preferably employed. Also, in the present invention, hydrolyzed ethylene-vinyl acetate copolymers having an intrinsic viscosity within the range of 0.7 to 1.5 dl./g. in a mixture of phenol and water (87 : 13 by weight) at 30°C. are generally employed. There may be also employed copolymers that not more than 5 % by mole in vinyl acetate component of the hydrolyzed copolymer is replaced with another monomer copolymerizable with ethylene and vinyl acetate, such as propylene, isobutylene, crotonic acid, acrylic acid, methacrylic acid, maleic acid and alkyl esters thereof. Hydrolyzed ethylene-vinyl acetate copolymers outside the above-mentioned range either on the ethylene content or the degree of hydrolysis are not suitable for the present invention since a molding prepared from such a copolymer is inferior in mechanical strength, hardness, water-resistance or antistatic charge.

According to the present invention, talc having a brightness of not less than 80 and having a particle size of not more than 840 $\mu$ and showing pH 7 to 9.5 in 5 % by weight aqueous suspension thereof is suitably employed though talc is not especially limited thereto, in which the brightness represents the value of reflectivity at 452 m$\mu$ in wave length by brightness meter, the hydrogen ion concentration (pH) represents the value measured by a glass electrode pH meter. Talc having a brightness of less than 80 is inferior in the point of the coloration of molding, and talc showing a hydrogen ion concentration of less than 7 is not effective because the melt viscosity of the composition increases gradually during molding, and also talc showing a hydrogen ion concentration of more than 9.5 is not effective because melt viscosity decreases due to the decomposition of copolymer at high temperature, and talc having a particle size of more than 840 $\mu$ is not effective because the miscibility with the copolymer is reduced.

The talc and the hydrolyzed ethylene-vinyl acetate copolymer are blended within the ratio of 5 : 95 to 50 : 50 by weight by means of a conventional manner to give a molding composition. When the talc content is less than 5 % by weight, the improvement is insufficient. On the other hand, when the talc content is more than 50 % by weight, the melt viscosity of the molding composition remarkably increases during molding and the appearance of the resulting molding such as gloss or smoothness becomes extremely worse together with the lowering of molding property of the composition.

When the talc is incorporated in quantity, for instance, in the range of 30 to 50 % by weight, the dispersion and miscibility of talc tend to decrease. Such a tendency can be dissolved by incorporating elastomers, for instance, block-copolymerized polyester-polyether such as HYTREL 5555 made by E. I. du Pont de Nemours & Company, ethylene-vinyl acetate copolymer, acrylonitrile-butadiene-styrene resin, ionomer such as SURLYN A made by E. I. du Pont de Nemours & Company, into the molding composition in the ratio of 2 to 10 % by weight per hydrolyzed ethylene-vinyl acetate copolymer. Incorporation of the elastomer of less than 2 % by weight is insufficient to improve the dispersion and miscibility of talc, and on the other hand, of more than 10 % by weight makes mechanical properties of resulting molding poor.

Further, if desired, the molding composition may be incorporated with known additives such as lubricant, stabilizer, plasticizer, filler other than talc, coloring agent or foaming agent, and known reinforcing agents such as glass fiber or carbon fiber. Incorporation of low molecular weight polyethylene or low molecular weight polypropylene is preferable to improve a flowabiltiy of molding composition.

The molding composition so obtained is then molded to the desired shape by means of usual manner such as injection molding, extrusion, compression molding, expansion molding, rotational molding, blow molding, casting or calendering. According to the present invention, a continuous molding for a long period is possible even in an injection molding which requires severe setting of molding conditions. The following is the typical conditions for injection molding. These are the typical example, and of course the molding conditions outside the below-mentioned range are applicable.

Cylinder temperature: 180° to 260°C.

| Nozzle temperature: | 170° to 260°C. |
|---|---|
| Mold temperature: | room temp. to 110°C. |
| Injection pressure: | 700 to 1,800 kg./cm.$^2$ |
| Back pressure: | 0 to 30 kg./cm.$^2$ |
| One cycle: | 2 to 20 sec. |
| Cooling time: | 5 sec. to 5 min. |

The present invention is more particularly described and explained by means of the following illustrative Examples, in which all parts are parts by weight and data of physical properties are the average value on five test pieces.

EXAMPLE 1

A Henschel mixer was charged with 85 parts of hydrolyzed ethylene-vinyl acetate copolymer ($[\eta]$=1.20, ethylene content: 30 % by mole, vinyl acetate content: 70 % by mole, and a degree of hydrolysis in vinyl acetate component: 99.5 % by mole) and 15 parts of talc made by Nippon Talc Kabushiki Kaisha of which article grade was SW (brightness: 87, pH: 8.8, and average particle size: 74 $\mu$). After mixing, the composition was taken out and molded once to pellets by an extruder having an inner diameter of 40 mm. Then, the pellets were provided into an injection molding machine of 3.5 oz.avdp. and molded under the conditions of nozzle temperature: 260°C., cylinder temperature at the front part: 260°C., cylinder temperature at the back part: 245°C., mold temperature: 90°C., injection pressure: 1,100 to 1,300 kg./cm.$^2$ and one cycle: 30 to 40 sec. to give following test pieces.

For measurement of heat deflection temperature:
Test piece according to the provision of ASTM D 648

For measurement of tensile strength:
Dumbbell test piece of type I according to the provision of ASTM D 638

For measurement of flexural strength:
Test piece according to the provision of ASTM D 790

For measurement of impact strength (Charpy impact strength, notched type):
Test piece according to the provision of ASTM D 256.

The injection molding proceeded smoothly, and the surface of the resulting molding was smooth and there was not observed the surface roughness and the flow mark. Further, various examinations were carried out to give moldings having a complex shape by injection molding. The molding also proceeds in good.

The results of measurement of physical properties were shown in Table 1.

The same procedure as in Example 1 was repeated except that talc was not incorporated into the copolymer, or instead of talc, calcined gypsum (reagent, chemical grade), calcium carbonate, titanium oxide or carbon black was employed as a filler, respectively.

The results of measurement of physical properties were shown in Table 1.

The molding was carried out with employing silica, clay, pyrophyllite, asbestos, garnet or calcium silicate as a filler in the same manner as in Example 1. However, the appearance of moldings was extremely poor because of occurrence of short shot, weld mark or flow mark, besides the torque loaded in screw extremely increased with the progress of continuous molding and eventually the molding became impossible.

Table 1

|  | Filler | Heat deflection temperature °C. | Impact strength kg.cm./cm. | Tensile strength kg./cm.² | Flexural strength kg./cm.² |
|---|---|---|---|---|---|
| Example 1 | Talc | 94 | 5.4 | 920 | 1570 |
| Comparative Example 1 | — | 69.5 | 5.0 | 880 | 1360 |
| Comparative Example 2 | Calcined gypsum | 80 | 3.2 | 870 | 1410 |
| Comparative Example 3 | Calcium carbonate | 76.5 | 4.8 | 805 | 1360 |
| Comparative Example 4 | Titanium oxide | 76 | 5.4 | 890 | 1420 |
| Comparative Example 5 | Carbon black | 86 | 2.8 | 860 | 1270 |

(Note 1) The heat deflection temperature was measured under a fiber stress of 18.56 kg./cm.² on absolutely dried test pieces according to the provision of ASTM D 648.

(Note 2) The impact strength was measured at a temperature of 20°C. on absolutely dried pieces according to the provision of ASTM D 256.

(Note 3) The tensile strength was measured at a temperature of 20°C. on absolutely dried pieces according to the provision of ASTM D 638.

(Note 4) The flexural strength was measured at a temperature of 20°C. on absolutely dried pieces according to the provision of ASTM D 790.

EXAMPLE 2

The same procedure as in Example 1 was repeated except that 70 parts of hydrolyzed ethylene-vinyl acetate copolymer ($[\eta]=1.0$, ethylene content: 38 % by mole, vinyl acetate content: 62 % by mole, and degree of hydrolysis in vinyl acetate component: 99.0 % by mole) and 30 parts of the talc instead of 85 parts of the copolymer and 15 parts of the talc. The injection molding was smoothly carried out.

As comparative Examples, the same procedure as in Example 2 was repeated except that talc was not incorporated into the copolymer, or instead of talc, calcium carbonate, titanium oxide, carbon black or calcined gypsum was employed as a filler, respectively.

When carbon black or calcined gypsum was employed as a filler, the injection molding for a long period was impossible.

The results were shown in Table 2.

Table 2

|  | Filler | Heat deflection temperature °C. | Impact strength kg.cm./cm. | Tensile strength kg./cm.² | Flexural strength kg./cm.² |
|---|---|---|---|---|---|
| Example 2 | Talc | 99 | 6.0 | 840 | 1450 |
| Comparative Example 6 | — | 64 | 6.0 | 770 | 1200 |
| Comparative Example 7 | Calcium carbonate | 72.5 | 4.3 | 690 | 1000 |
| Comparative Example 8 | Titanium oxide | 77 | 6.0 | 830 | 1380 |

EXAMPLE 3

The same procedure as in Example 1 was repeated except that hydrolyzed ethylene-propylene-vinyl acetate copolymer ($[\eta]=1.0$, ethylene content: 28 % by mole, propylene content: 3.5 % by mole, vinyl acetate content: 68.5 % by mole, and degree of hydrolysis in vinyl acetate component: 99.3 % by mole) was employed instead of hydrolyzed ethylene-vinyl acetate copolymer.

The injection molding smoothly proceeded and a molding having a good appearance was obtained.

The results were as follows:

| Heat deflection temperature: | 93°C. |
|---|---|
| Impact strength: | 5.6 kg.cm./cm. |
| Tensile strength: | 900 kg./cm.² |
| Flexural strength: | 1,550 kg./cm.² |

As a control, the results in the case of molding prepared from only the hydrolyzed ethylene-propylene-vinyl acetate copolymer was given.

| Heat deflection temperature: | 61°C. |
|---|---|
| Impact strength: | 5.0 kg.cm./cm. |
| Tensile strength: | 840 kg./cm.² |
| Flexural strength: | 1,550 kg./cm.² |

EXAMPLES 4 to 5

The same procedure as in Example 1 was repeated except that 60 parts of hydrolyzed ethylene-vinyl acetate copolymer ($[\eta]=1.1$, ethylene content: 30 % by mole, vinyl acetate content: 70 % by mole, and degree of hydrolysis in vinyl acetate component: 99.5 % by mole), 40 parts of talc and 5 parts of elastomer were employed instead of 85 parts of the copolymer and 15 parts of talc.

As an elastomer, HYTREL 5555 (Example 4) and ethylene-vinyl acetate copolymer (ethylene content: 72 % by weight, vinyl acetate content: 28 % by weight, and melt index: 15) (Example 5) were employed, respectively.

The injection molding proceeded smoothly, and the surface of the resulting moldings was smooth and did not show any weld mark or flow mark.

What we claim is:

1. A molding composition comprising 95 to 50 % by weight of hydrolyzed ethylene-vinyl acetate copolymer and 5 to 50 % by weight of talc; said hydrolyzed ethylene-vinyl acetate copolymer having an ethylene content of 20 to 50 % by mole, a vinyl acetate content of 80 to 50 % by mole and a degree of hydrolysis in vinyl acetate component of not less than 90 % by mole.

2. The molding composition of claim 1, wherein said hydrolyzed ethylene-vinyl acetate copolymer has an ethylene content of 25 to 40 % by mole, a vinyl acetate content of 75 to 60 % by mole and a degree of hydrolysis in vinyl acetate component of not less than 95 % by mole.

3. The molding composition of claim 1, wherein said talc has a brightness of not less than 80 and a particle size of not more than 840 $\mu$ and shows pH 7 to 9.5 in 5 % by weight aqueous suspension thereof; said brightness being the value measured at 452 m$\mu$ in wave length by brightness meter.

4. The molding composition of claim 1, in which an elastomer is further incorporated in the ratio of 2 to 10 % by weight per the hydrolyzed ethylene-vinyl acetate copolymer.

5. A molded article comprising the molding composition of claim 1.

* * * * *